United States Patent [19]

White

[11] 4,348,744

[45] Sep. 7, 1982

[54] METHOD AND PORTABLE APPARATUS FOR COMPARISON OF STORED SETS OF DATA

[76] Inventor: Edward A. White, 5780 Echo Canyon Cir., Phoenix, Ariz. 85018

[21] Appl. No.: 258,767

[22] Filed: Apr. 29, 1981

Related U.S. Application Data

[63] Continuation of Ser. No. 893,342, Apr. 4, 1978, abandoned.

[51] Int. Cl.[3] ...................... G06F 15/336; G06F 7/20; G06F 15/16; G06F 15/44

[52] U.S. Cl. .................................. 364/900; 364/410; 364/419; 434/237; 340/146.2; 340/825.3; 273/237

[58] Field of Search ... 364/200 MS File, 900 MS File, 364/410, 413, 415, 418, 419, 704, 706, 709, 715, 728; 340/146.3 Q, 825.3, 825.34, 146.2; 434/201, 237, 335, 336, 338, 350; 273/237, 238

[56] References Cited

U.S. PATENT DOCUMENTS

| | | | |
|---|---|---|---|
| 3,816,722 | 6/1974 | Sakoe | 364/728 |
| 3,906,460 | 9/1975 | Halpern | 364/900 |
| 3,976,840 | 8/1976 | Cleveland . | |
| 4,005,388 | 1/1977 | Morley | 364/900 |
| 4,051,605 | 10/1977 | Toal | 364/410 X |
| 4,079,365 | 3/1978 | Yamauchi | 434/350 |
| 4,115,870 | 9/1978 | Lowell | 364/900 |
| 4,159,530 | 6/1979 | Raimond | 364/900 |
| 4,205,464 | 6/1980 | Baggott | 434/336 |
| 4,277,837 | 7/1981 | Stuckert | 364/900 |

*Primary Examiner*—James D. Thomas

*Attorney, Agent, or Firm*—Cahill, Sutton & Thomas

[57] ABSTRACT

Method and portable processor for storing and comparing sets of personal data relating to personal preferences and personality. First and second portable processing units each include a processor, a memory, an input device, a display device, and a connector. The owner of a portable processor can enter personal data via the input device of the portable processor in response to a questionnaire. The owner of that portable processor may then meet another person having a similar or identical portable processor storing that person's personal data. The two persons can interconnect the two portable processors by means of the connectors. Each portable processor transmits its data to the other and compares its stored data with corresponding data received from the other portable processor. Stored algorithms in each portable processor operate on the compared data to compute a score representing the degree of personal compatibility of the two persons and display the score by means of the respective display devices.

35 Claims, 16 Drawing Figures

METHOD AND PORTABLE APPARATUS FOR COMPARISON OF STORED SETS OF DATA

This is a continuation of application Ser. No. 893,342, filed Apr. 4, 1978, now abandoned.

Background of the Invention

The invention relates to portable processing units, and particularly to interconnectable portable processing units for storing and comparing sets of personal data stored therein and to methods of comparing such data.

A number of tests have been devised by psychologists to obtain personality profiles of individual men and women. Usually, the man or woman answers a large number of questions to provide the personality data upon which such tests and comparisons are based. Such personality data can then be compared for an individual man and woman to provide an indication of their compatibility as potential marriage partners. A large number of books and articles on the general subject of dating, compatibility with members of the opposite sex, personality analysis, and criteria compatibility for successful marriages are widely available. One book directed to this general subject matter is "Compatibility Test" by Charles M. Whipple, Jr., and Dick Whittle, 1976, Prentice-Hall, Inc. Many individuals, including persons who have never been married or recently divorced persons wishing to meet persons of the opposite sex with whom they are compatible, read such books and publications in an attempt to obtain greater insights into their own personalities and personalities of others Single persons who become personally involved and begin to seriously contemplate marriage to each other often consult professional counselors or psychologists, who administer various psychological tests, such as the Edwards Personal Preference Test, and advise the clients on the basis of data obtained from such tests. However, this approach is unsatisfactory during the early stages of a relationship between a man and a woman because of the inconvenience and expense involved. Up to now, no suitable method conducive to comprehensive comparison of the personality data between a man and a woman early in their relationship is available. Yet, it is early in the relationship that such a comparison might be most helpful, since it is well known that strong attachments may be formed between highly incompatible persons. Such attachments frequently result in unhappy marriages or unhappy endings to such relationships.

Nowadays, single men and women frequently congregate in so-called "singles" organizations, such as Parents Without Partners, or in "singles bars". In such places, and on many other occasions, a single person has the opportunity to meet a large number of persons of the opposite sex who are also interested in meeting persons with whom to date and become acquainted. In many instances it would be helpful for single persons to have a convenient, inexpensive, and reasonably reliable means of "screening" persons of the opposite sex they meet in order to get a preliminary indication of personality compatibility. It would be highly desirable that such means of "screening"]not interfere with the ordinary inter-personal interaction by which single persons customarily get to know each other. In the past, computers have been utilized to store personality data for individuals. Computers have also been utilized to compare sets of data for a pair of individuals to determine their areas of compatibility and/or incompatibility as potential mates. However, the general purpose which computers have been utilized for is obviously unsatisfactory for "on-the-spot" analysis and/or comparison of personality data for a man and a woman at the scene of their first meetings. Computerized datig services which select supposedly compatible "dates" for subscribers to the dating services are known. However, such dating service organizations are very expensive, and prevent the individual man or woman from having the freedom of spontaneously selecting dating partners. Further, due to the high cost and loss of privacy of such computerized dating services, the pool is available individuals from which supposedly compatible dating partners may be selected is very small.

In summary, there exists a need for an inexpensive, yet convenient means for on-the-spot comparing of personality profiles of men and women to aid them in discovering their various areas of basic compatibility with each other.

SUMMARY OF THE INVENTION

Accordingly, it is an object of the invention to provide a low cost system and method for storing and comparing sets of data.

It is another object of the invention to provide a low cost portable system and apparatus especially suitable for storing and comparing sets of personal preference data and/or personality data and computing and displaying a compatibility score.

It is another object of the invention to provide a portable low cost system for storing and comparing sets of personality data, which system is sufficiently small in size to be easily carried in a person's pocket, purse, or worn as an ornament.

It is another object of the invention to provide a portable, inexpensive multi-purpose data comparison system.

Briefly described, and in accordance with one embodiment thereof, the invention provides a portable system and method for comparison of stored sets of data. The system includes two portable processors each having a memory for storing a data set and operating software. The respective owners of each portable processor can enter personal data into the memories of the respective portable processors. The two portable processors can be interconnected by male and female connectors or by optical coupling devices such that the operating program of each causes it to transmit its stored data to the other portable processor and compare its stored data with corresponding data received from the other unit. The software of each portable processor causes that portable processor to compute a score indicative of the degree of matching or compatibility between the two sets of data and display that score by means of a display unit of that portable processor. In one embodiment of the invention, each portable processor includes a microprocessor, a random N channel MOS access memory, a read only memory, and an interface adapter, each implemented by means of respective N channel MOS integrated circuits, which are utilized in conjunction with a light emitting diode alphanumeric display unit. In another embodiment of the invention, complementary metal oxide semiconductor integrated circuits are utilized to implement the microprocessor, the read only memory, the random access memory and the interface circuitry, and an alphanumeric liquid crystal display unit is utilized to display the compatibility scores computed. In another embodiment of the invention, the portable processor, has storage elements for temporarily storing data received from another portable processor. The portable processor is subsequently connected to a central data processing system to input the temporarily stored data to the central data processing system, which utilizes stored algorithms to analyze and compare the received data with the data of the owner of the portable processor being utilized to enter the data into the central data processing system. In yet another embodiment of the invention, the portable processor includes expanded algorithms and storage capability for storing additional sets of data, and is capable of receiving and comparing data received from a separate portable processor with a different operating algorithm. In yet another embodiment of the invention, the portable processor has its operating program and algorithm stored in an electrically alterable read only memory and may be connected to a central data processing system to update the operating software and algorithm by altering the contacts of the electrically alterable read only memory. Another embodiment of the invention is incorporated in an electronic timepiece or calculator.

DESCRIPTION OF THE INVENTION

Figure 1:
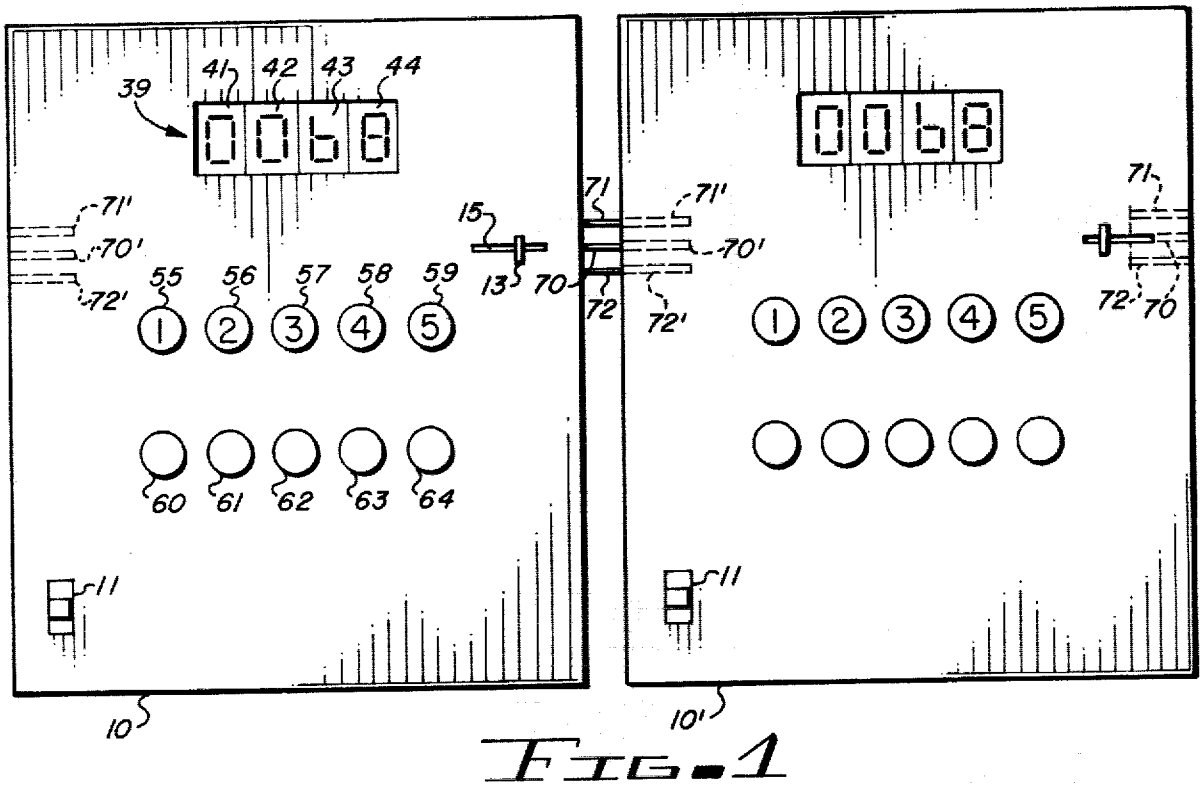
FIG. 1 is a diagram showing two portable processing units coupled together according to the invention.

FIG. 1 shows a portable processor 10 having a display unit 39 including four separate units 41, 42, 43, and 44, each of which is a seven segment alphanumeric light emitting diode display unit. Portable processor unit 10 includes a switch 11, which may be utilized to connect power to the internal microprocessor, as explained subsequently. Portable processor unit 10 also includes five data entry keys 55, 56, 57, 58 and 59. Portable processor unit 10 includes five control keys, labeled 60, 61, 62, 63, and 64.

Portable processor unit 10 includes sockets 70', 71', and 72', which may be utilized to temporarily connect portable processor 10 to an identical or similar portable processor 10'. Portable processor 10 further includes extendable prongs 70, 71, and 72, which may be extended outwardly from the side of portable processor 10 by means of lever 13, which slides to the right in slot 15, so that prongs 70, 71, and 72 are inserted into portable processor unit 10'.

As explained subsequently in greater detail, each of portable processors 10 and 10' of FIG. 1 stores at least one set of personal data which has been previously entered into the respective portable processors by means of the above-mentioned control keys and data keys of the respective portable processors. Each of portable processors 10 and 10' include a microprocessor and a memory for storing a set of data and an operating program. Each portable processor stores an operating program which permits that unit to compare its own stored data set with the data set from the other portable processor, and compute a "score" which indicates the level of personal compatibility between the persons from whom the two data sets were obtained.

Of course, the external shapes of the portable processors may be varied greatly from the shapes shown in FIG. 1. For example, heart-shaped units could be utilized. As subsequently explained with reference to FIGS. 10 and 11, the portable processors of the invention can be incorporated into ordinary pocket calculators or electronic wristwatches. Differently shaped units could be utilized for men's units and women's units. By incorporating all of the digital circuitry on a single integrated chip and utilizing miniature display units and input keys, the portable processors may be sufficiently small to be easily carried in a pocket or purse, or even worn as an ornament.

Figure 2:
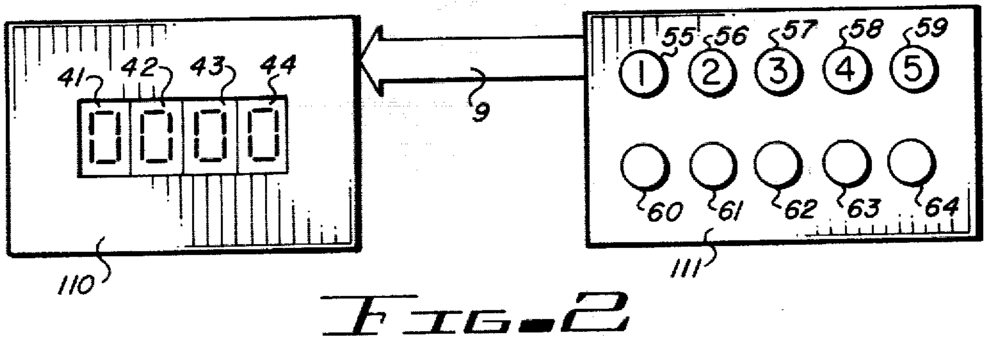
FIG. 2 is a diagram showing a portable processor having no data input keys, wherein a remote inputting device is utilized to enter a set of data into the portable processor.

If desired, the keys shown in FIG. 1 may be eliminated, to provide a portable processor such as 110 in FIG. 2, and data may be entered therein by means of a remote keyboard input unit 111 as shown in FIG. 2. Remote input unit 111 is coupled by means of an appropriate cable 9 to portable processor unit 110.When two portable processors such as 110 in FIG. 2 are mated, they automatically exchange data amd compute a compatibility score, which is then displayed in the display unit 39.

Figures 3A, 4:
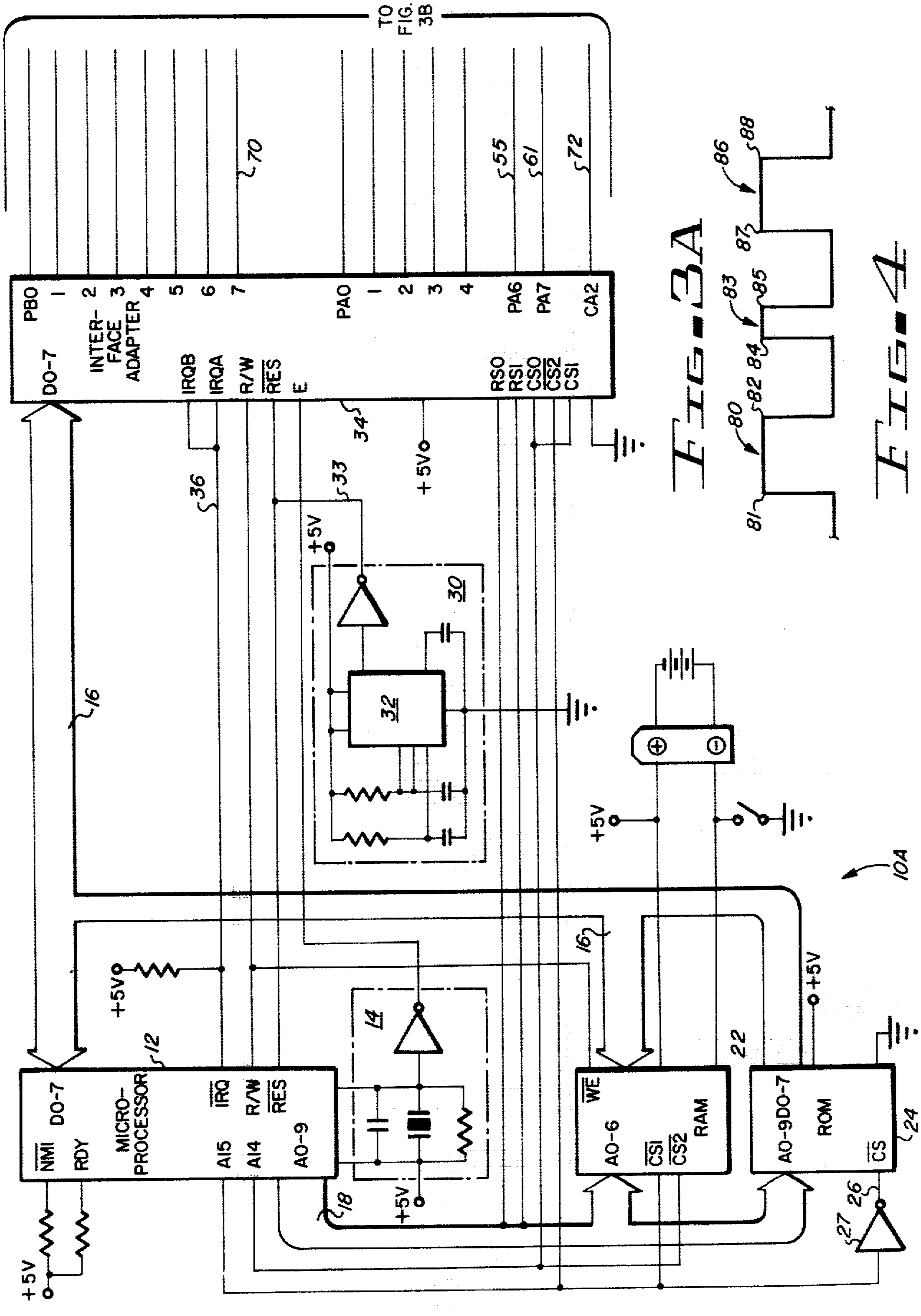
FIGS. 3A and 3B together, constitute a schematic diagram of circuitry of one embodiment of the invention.
FIG. 4 is a waveform showing the format of data serially transmitted by the portable processor circuit of FIGS. 3A and 3B.
Figure 3B:
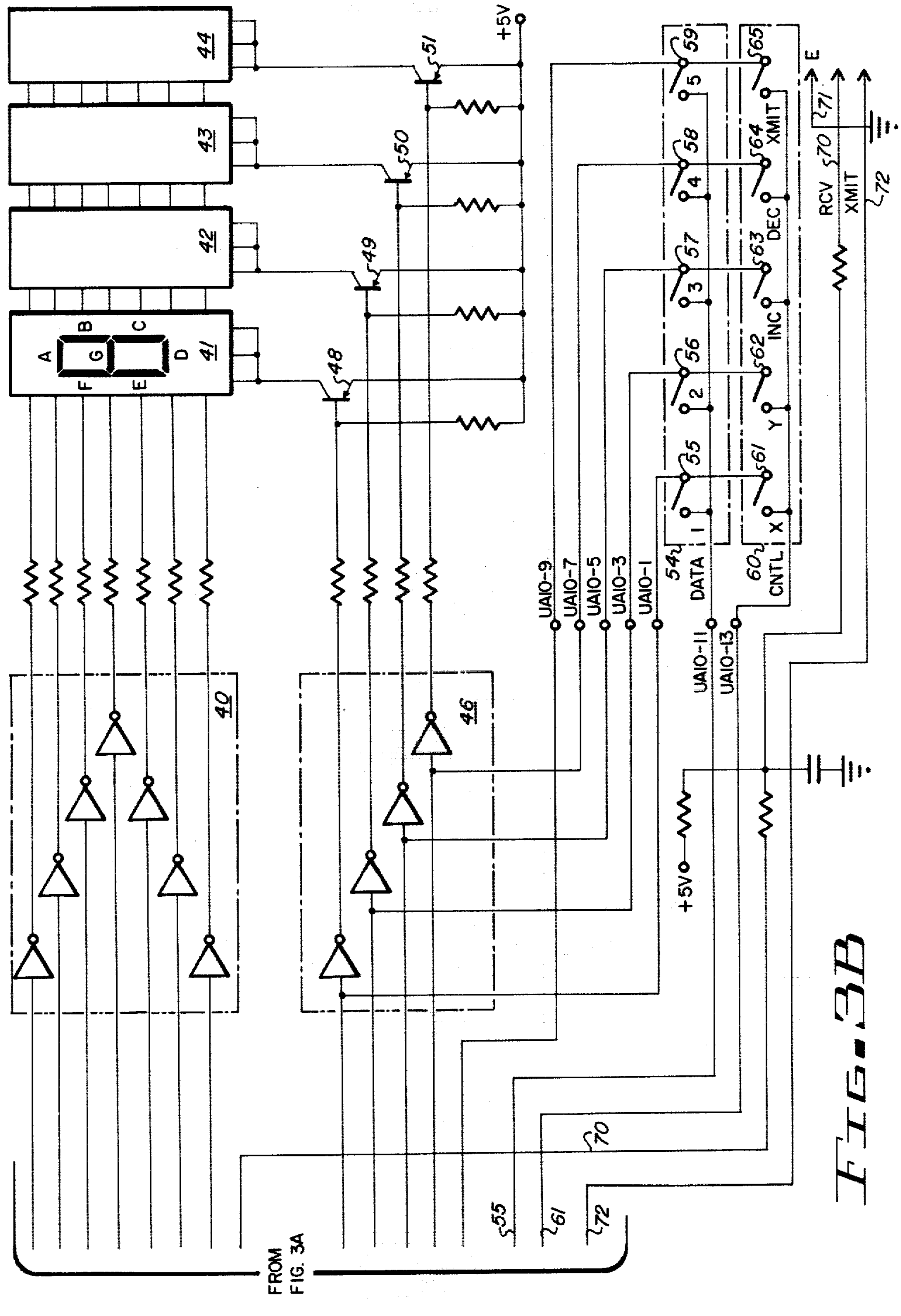

The detailed circuitry 10A for a working model of portable processor unit 10 is shown in FIGS. 3A and 3B.

Referring now to FIGS. 3A and 3B, circuitry 10A of portable processor 10 includes microprocessor 12, which is an eight bit microprocessor. Microprocessor 12 can be implemented by utilizing the MOS Technology Inc. model 6502 microprocessor; the same model of microprocessor is also manufactured by Synertek Corporation and North American Rockwell Corporation. A crystal oscillator circuit 14 produces the clock signals required for operation of microprocessor 12. Microprocessor 12 has its data terminals D0–D7 coupled to the corresponding conductors of bidirectional data bus 16. The microprocessor address outputs A0–A9, indicated generally by reference numeral 18, are connected to the corresponding address inputs A0–A6 of random access memory 22 and the corresponding address inputs A0–A9 of read only memory 24.

Random access memory 22 can be implemented by utilizing a Motorola MCM6810 128 word by eight bit static random access memory. Two chip select inputs, CS1 and CS2 of random access memory 22 are connected to the A14 and A15 address outputs, respectively, of microprocessor 12. Random access memory 22 has its data input/output terminals connected to bidirectional data bus 16.

Random access memory 22 is utilized to store a plurality of pairs of values of X and Y, hereinafter referred to as X-Y data pairs, wherein X and Y are variables which represent answers given in response to questions from a questionnaire and entered into portable processor 10. The questionnaire includes a plurality of questions which are grouped in pairs, each pair including an "X" question and a "Y" question. The response to each "X" question may be selected as an integer from 1 to 5, the numbers from 1 to 5 designating the "degree" or "weight" of the "X" variable for that question. For each "Y" question, the response selected is also an integer from 1 to 5. In this case, the integers from 1 to 5 indicate the "importance" of the previous "X" variable to the person responding to the questionnaire.

The following six questions and selectable responses constitute three pairs of "X" questions, and corresponding "Y" questions illustrative of the type and manner of data which may be entered into random access memory 22.

1. My education is:
   X
   1 more than a college degree
   2 a college degree
   3 some college
   4 graduated from high school
   5 less than high school diploma
2. My mate's education is:
   Y
   1 not important
   2 somewhat of interest
   3 at my own level
   4 important to be at my level
   5 essential to be at my level
3. I believe that Bible is:
   X
   1 the literal truth
   2 most, but not all of the bible is literally true
   3 some of the Bible is literally true, but all of it stands for the truth
   4 the Bible is of no significance to me
   5 the Bible is merely writings of historical value
4. My mate's opinion of the Bible is:
   Y
   1 not important
   2 somewhat of importance
   3 desirable to be like mine
   4 important to be like mine
   5 essential to be like mine
5. I prefer to live in:
   X
   1 a rural area
   2 a town far from the city
   3 a town near large city
   4 a small city (50,000 to 150,000)
   5 a large city
6. My mate's preference:
   Y
   1 is of no importance
   2 is somewhat of interest
   3 desirable to be like mine
   4 important to be like mine
   5 essential to be like mine For example, question 1 is an "X" question. The respondent to the questionnaire selects one of the digits (1 to 5) and enters it as a value of X for the first X-Y data pair. He then selects one of the responses (1-5) to question 2, which is the "Y" question of the first pair of questions, and enters the selected digit as the value of Y for the first X-Y data pair. In a similar amount, a large amount of data in the form of X-Y data pairs in response to a plurality of additional pairs of questions may be entered into random access memory 22.

Of course, the size of random access memory 22 can be increased to store data corresponding to any number of questions.

Referring again to FIG. 3A and 3B, read only memory 24 can be implemented utilizing an Intel model 2758 erasable programmable read only memory. A wide variety of other commercially available read only memories can also be utilized. Address inputs A0-A9 of programmable read only memory 24 are connected to the corresponding A0-A9 inputs of microprocessor 12 by means of address bus 18. A chip select input is connected to conductor 26, which is also connected to inverter 27. Inverter 27 produces the complement of the A15 address output of microprocessor 12. Data bus terminals D0-D7 of read only memory 24 are connected to bidirectional data bus 16.

Portable processor 10 includes a "power on reset" circuit 30, including a "one-shot" integrated circuit 32, which may be implemented utilizing a National Semiconductor LM555 "one-shot" integrated circuit. The output of "power on reset" circuit 30 is applied to the reset inputs of microprocessor 12 and interface adaptor 34.

The "power on reset" input signal produced on conductor 33 enables microprocessor 12 to internally initialize its circuitry, and also clears the appropriate internal registers of interface adaptor 34 to permit proper "start up" operation of portable processor 10.

Interface adaptor 34 is implemented utilizing a MOS Technology model 6520 programmable peripheral interface adaptor, which is identical to the Motorola MC6820 peripheral interface adaptor. The D0-D7 terminals of interface adaptor 34 are connected to bidirectional data bus 16. The interrupt conductors IRQA and IRQB are connected to conductor 36, which is connected to the IRQ input of microprocessor 12 and to the five volt power supply by means of a resistor, which maintains conductor 36 at a logical "1" so that the interrupt circuitry of microprocessor 12 remains inactive. (Of course, other embodiments of the system disclosed herein could readily be supplied by those skilled in the art to take advantage of the interrupt operation capability of both microprocessor 12 and interface adaptor 34.) The register select inputs and chip select inputs of interface adaptor 34 are connected to the A0 and A1 address inputs of microprocessor 12 and to the A14 and A15 address outputs of microprocessor 12, respectively.

Interface adaptor 34 has two eight-bit peripheral data busses, designated PB0-PB7 and PA0-PA7. The PB0-PB6 peripheral data bus outputs of interface adaptor 34 are utilized to drive seven inverters in block 40 of FIG. 3B, which inverters function as display drivers to drive the raw inputs of display units 41, 42, 43, and 44. Display units 41, 42, 43, and 44 may be either light emitting diode alphanumeric display units or liquid crystal alphanumeric display units. Peripheral data bus outputs PA0–PA3 of interface adaptor 34 are utilized to drive four inverters in block 46 to FIG. 3B, the outputs of which inverters are connected to drive the bases of PNP transistors 48, 49, 50, and 51, respectively. The collectors of transistors 48, 49, 50, and 51 are connected to drive the column inputs of alphanumeric display devices 41, 42, 43, and 44 respectively.

The PA0–PA4 terminals of interface adaptor 34 are utilized to sense switch closures of five data switches generally indicated in block 54 of FIG. 3B and five control switches in block 60 of FIG. 3B. Each of data switches 55, 56, 57, 58, and 59 has a first terminal connected to the peripheral data bus terminals PA0, PA1, PA2, PA3, and PA4, respectively, which peripheral data bus terminals are initially programmed as inputs to interface adaptor 34 such that the switch closure information is transferred via bidirectional data bus 16 to microprocessor 12 during system operation. Each of control switches 61, 62, 63, 64, and 65 each also has a first terminal connected, respectively, to the corresponding first terminals of the above data switches.

Data switches 55, 56, 57, 58, and 59 correspond to the above-described selectable values of the X variables and Y variables, namely the digits 1-5. Each of the data switches also has a second terminal connected to conductor 55. Conductor 55 is connected to the PA6 peripheral data bus of interface adaptor 34. The PA6 peripheral data bus terminal is programmed as an output having a predetermined logic level thereon during system operation. Each of the above control switches also has a second terminal connected to conductor 61, which is connected to the PA7 peripheral data bus terminal of interface adaptor 34. The PA7 periheral data bus terminal is also programmed as an output during system operation. The control switches 61, 62, 63, 64 and 65 are designated as the X,Y, increment (INC), decrement (DEC), and transmit (XMIT) switches respectively in FIG. 3B.

The X and Y switches 61 and 62 are utilized for the purpose of determining whether the presently selected data value inputted to portable processor 10 is an "X" value or a "Y" value. Increment switch 63 is utilized to increment to the next stored X-Y pair in random access memory 22 to permit displaying of the corresponding stored values of X and Y for that X-Y data pair. Similarly, decrement switch 64 permits decrementing to the preceding X-Y pair stored in random access memory to permit display of the stored values thereof. Transmit switch 65 is utilized to cause the portable processor to initiate transmission of a reference pulse (as shown by reference numeral 80 in FIG. 4) to portable processor 10', as shown in FIG. 1, thereby initiating transmission of data stored in random access memory 22 of portable processor 10 to portable processor 10' to permit portable processor 10' to compare such received data with corresponding stored data in portable processor 10', as previously mentioned (and subsequently described in greater detail).

As indicated above, with reference to FIG. 1, all communication between computers 10 and 10' occurs over transmit line 72 and receive line 70. Transmit line 72 is connected to the CA2 terminal of interface adaptor 34, which can be programmed as either an input or an output of interface adaptor 34 during the initial start-up operation of the portable processor, so that stored data can be transferred from microprocessor 12 via a predetermined conductor of bidirectional data bus 16 into a corresponding bit of an internal register of interface adaptor 34 and then shifted serially out on transmit bus 72 to second portable processor 10'.

Receive conductor 70 permits portable processor 10 to receive data in serial format from portable processor 10'. Receive line 70 is connected to the PB7 terminal of interface adaptor 34. The PB7 terminal of interface adaptor 34 may be initially programmed as an input by the operating software, so that data received from portable processor 10' is transmitted from interface adaptor 34 to microprocessor 12 via bidirectional data bus 16. The roles of transmit line 72 and receive line 70 may be reversed by the operating software, depending upon which of portable processors 10 and 10' has its transmit switch 65 closed first.

In order to avoid the necessity of expensive precision timing circuitry for detecting whether signals transmitted on lines 70 and 72 are logical "ones" or "zeros", the operating software stored in read only memory 24 is programmed to permit each portable processor to transmit an initial signal to the other unit in response to activating of transmit switch 65, so that the receiving portable processor can measure the width of a reference pulse 80, as shown in FIG. 4. The waveform shown in FIG. 4 illustrates initial reference pulse 80, which has a width equal to the time duration between edge 82 and edge 84 of the subsequent pulse 83 which, for purposes of illustration, is chosen to have a width between points 84 and 85 equal to one third of the timed elapsed between points 84 and 87. The elapsed time between points 84 and 87 is equal to the elapsed time between points 81 and 84. A pulse having a width equal to the width of pulse 83 followed by a "low" level equal to the time between points 85 and 87 is interpreted by the receiving unit to be a logical "zero" on the basis of the initially measured width of reference pulse 80; a wider pulse is interpreted as a logical "one". Thus, relatively imprecise timing generators such as 14 may be utilized for portable processors 10 and 10' without harming the reliability of detecting of logic levels of data serially transmitted between the two portable processors.

An algorithm which performs the interpretation of the received logic levels is stored in read only memory. This algorithm awaits leding edge 81 of the reference pulse 80 received by the receiving portable processor and counts the number of machine cycles which occur until the arrivel of edge 82. The receiving portable processor stores this count as a reference. The duration of each succeeding pulse received by the receiving portable processor is then compared to the stored reference, and if such duration is less than the duration of the reference, that succeeding pulse is interpreted as a logical "zero", and if its duration exceeds the duration of the reference pulse, it is interpreted as a logical "one".

A flow chart of the operating program stored in read only memory 24 is shown in FIGS. 6A-E. Referring now to FIGS. 6A-E, after turning the power on and system initialization (indicated in block 120), the stored program operates to continually produce signals required to display the appropriate alphanumeric characters on display elements 41-44 of FIGS. 1, 2, and 3B. The four alphanumeric characters represent the values of selected X-Y data pairs stored in random access memory 22 or "scores" resulting from comparison of data stored in one of the portable processors and compared with corresponding data received from another portable processor. It will be recalled that there are a predetermined number of X-Y data pairs stored in random access memory 22. Each time the stored program displays one of the four digits, as indicated in block 124 of FIG. 6A, the program enters decision block 126 to determine whether a "receive and full" condition is met. If the "receive and full" condition has not been met, the program enters decision block 128 to check the keyboard to determine if any of the data keys 55–59 or control keys 61–65 have been depressed. If none of the keys has been depressed, the program reenters display routine 124 to cause the next digit to be displayed. Thus, the four alphanumeric display units are operated at approximately a twenty-five percent duty cycle at a sufficiently fast rate that the human eye will perceive all four display digits as being continuously displayed.

If the program detects that a key has been depressed, the program exits from the display routine. When a signal is received indicating that the depressed key has been released, the program reenters display subroutine 124. If the key has not been released, decision block 132 is entered to determine which key is depressed. If a data input key has been depressed, the program then determines whether the switch closure represents an "X" data input or a "Y" data input. If the switch closure represents a "X" data input, that value of X is stored and a "flag" is set to establish that the next data number received will be a "Y" data value. The program then selects an appropriate subroutine represented by block 122 to display the value of the inputted "X" data number.

Figure 6A:
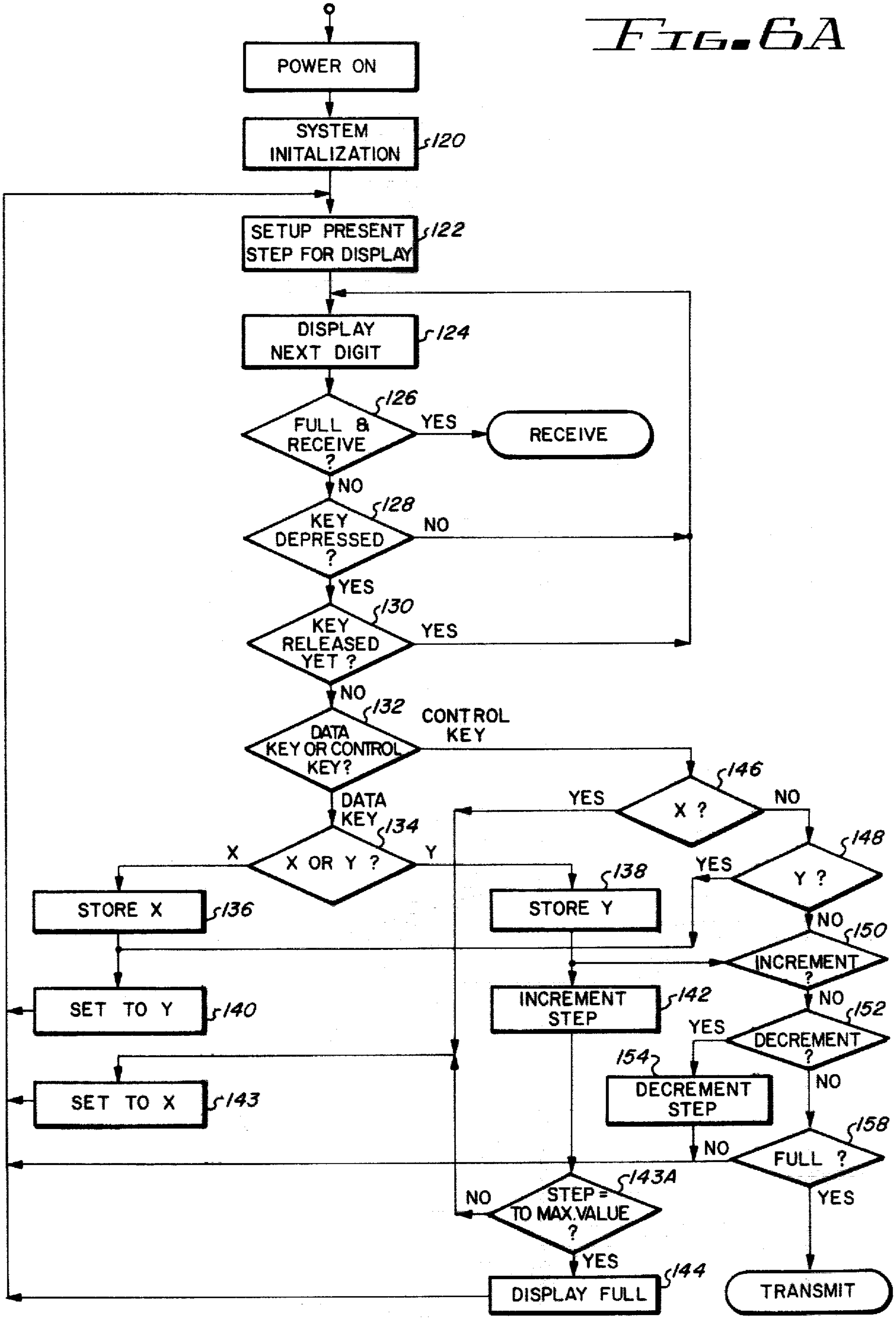
FIGS. 6A through 6E constitute a flow chart of the stored program which controls operation of the portable processor implemented by the circuitry of FIGS. 3A through 3B.

If it is determined in decision block 134 that the inputted number is a "Y" value, that value is stored, as indicated in block 138 of FIG. 6A, and the "number" of the X-Y pair is incremented and a "flag" is set to establish that the next data number imputted will be a "X" value. If the X-Y pair number being inputted is equal to the maximum X-Y pair number permitted to be stored in random access memory 22, the program causes display routine 124 to display the word FULL in the alphanumeric display elements after that X-Y pair is inputted. Decision block 126 then performs the function of causing the program to enter the RECEIVE subroutine shown in FIG. 6D.

Decision block 130 causes the program to jump back into display routine 124 if the depressed key has not yet been released, but the information corresponding thereto has already been processed. In the event that the information corresponding to the still-depressed key has not yet been processed, the program determines whether that key was a data input key or a control key in decision block 132.

If the program determines in block 132 that the depressed key is a data key and then determines (in decision block 134) that the inputted data number is an X value, the data number is stored in the appropriate part of random access memory 22, as indicated by block 136 of FIG. 6A and sets the above mentioned flag to indicate that the next data key closure represents a "Y" value, as indicated in block 140 of FIG. 6A. The program then reenters the display mode and further executes the instructions represented by blocks 122, 124, 126, and 128 of FIG. 6A.

If the data number is a "Y" value, that value is stored in the appropriate location of random access memory 22. Also, the current X-Y pair number is incremented, as indicated by block 142, since the X number and Y number of an X-Y data pair are always entered sequentially. The program then again enters the display mode and waits for additional key closures. Each time the X-Y pair number is incremented, the program also checks to determine whether the maximum permitted X-Y pair number has been reached. If this condition is present, the program causes the display unit to display the word FULL, as indicated by block 144. Once the maximum X-Y pair number has been attained, all of the data to be compared has been entered into the portable processor. A flag bit is then set to permit the portable processor to receive data from another portable processor coupled thereto, as shown in FIG. 1. In block 126, if the X-Y data pairs have all been inputted and the FULL condition has been attained, the program checks to determine if any data has been received on the receive line every time a keyboard check operation is performed.

If both interconnected portable processors 10 and 10' are in the "FULL" condition, either portable processor can receive an incoming digit transmitted by the other portable processor, or a users can push the transmit button (such as transmit control switch 65 in FIG. 1) on one of the two portable processors, thereby initiating transmission of X and Y data pairs between the two portable processors. Comparison of the two stored data sets in the respective portable processors then proceeds.

For a portable processor operating in the "receive" mode, the received reference pulse 80 (FIG. 4) is followed by four bits which are interpreted as logical "ones" or "zeros" by comparing their width to the width of reference pulse 80. The four bits represent a binary coded decimal digit. By convention, the first digit received is the first X value received from the sending portable processor, referred to as the first portable processor in the following discussion. The receiving portable processor, referred to as the second portable processor in the following discussion, compares the received X value with the corresponding value of X stored in its own memory and stores the difference, as subsequently explained. Next, the second portable processor sends its first X value to the first portable processor, which also compares its own stored value of X with the value of X received from the second portable processor. The second portable processor then awaits reception of the next digit, which, by convention is a Y digit of the first X-Y pair transmitted by the first portable processor. The second portable processor then processes that value of Y to determine and store the larger of the two Y value of the two first corresponding X-Y data pairs, as subsequently explained. The second portable processor then sends the Y value of its first stored X-Y pair to the first portable processor, which also processes that Y value in the same manner. At this point, both the first and second portable processors each store the "partial results" resulting from the above-described computations.

After the above-described procedure has been completed for all X-Y data pairs stored in both first and second portable processors, the cumulative stored results are processed as indicated in block 178. The result is displayed as indicated in block 179 of FIG. 6B, for the first portable processor. Blocks 168 and 169 of FIG. 6D apply to the second portable processor.

Figure 6B:
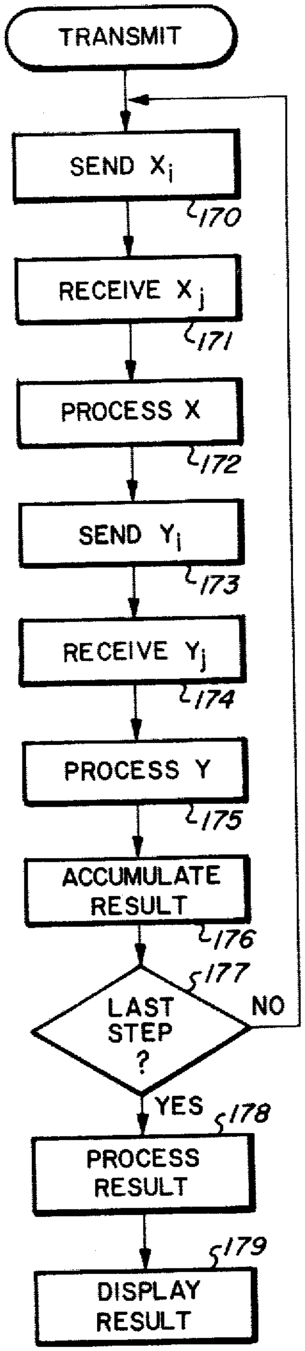
Figure 6C:
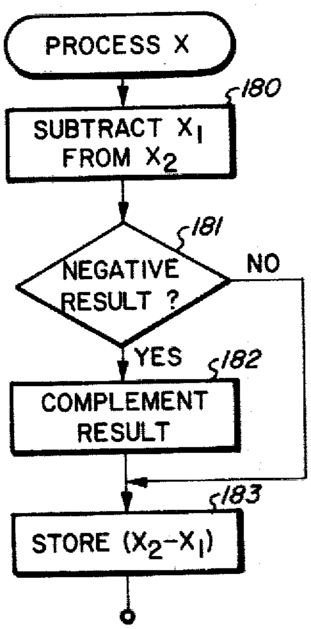
Figure 6D:
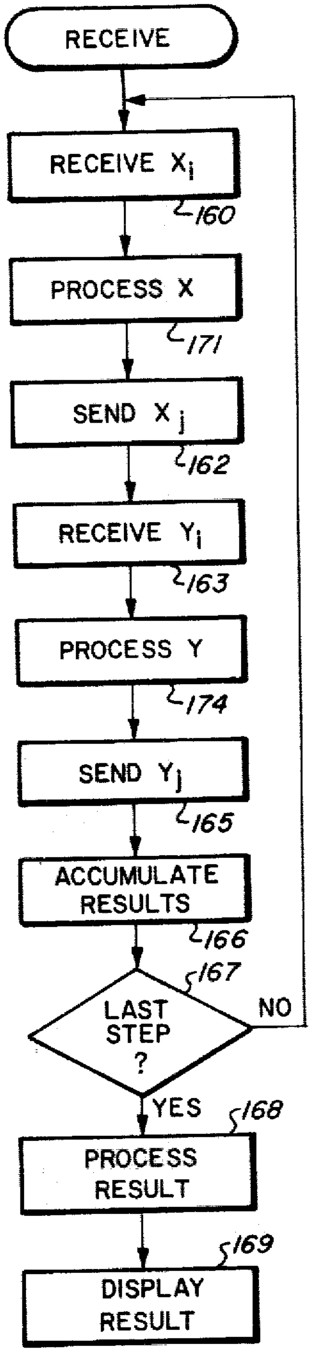

Once both portable processors are in the "display result" modes corresponding to block 169 of FIG. 6D and 179 of FIG. 6B, both portable processors are ready for new X and Y data to be entered or to perform another data comparison with other portable processors.

It should be noted that for the program disclosed herein, the method of operation contemplates sequential entry of the entire stored set of data if the portable processor is in the data entry mode, or comparison of two complete sets of data for two interconnected portable processors if both are in the data comparison mode of operation. However, the operating software could be readily modified, at some additional expense and with requirement of additional random access memory and read only memory storage space, to permit addressing of selected X-Y data pairs and modifying only those X-Y data pairs.

Figure 6E:
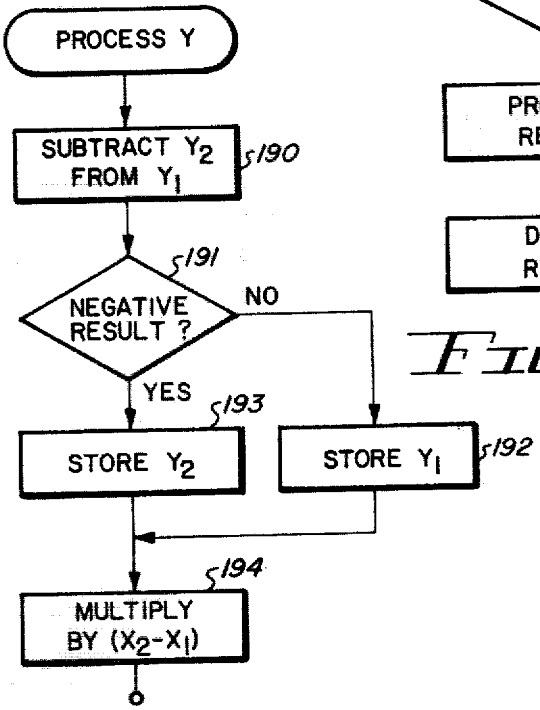

The PROCESS X subroutine shown in Block 172 of FIG. 6B is shown in further detail in FIG. 6C, and includes the steps of obtaining the difference between the stored and received values of X for the current X-Y data pair, determining whether the difference is negative, complementing the result if the difference is negative, and reentering the TRANSMIT subroutine of FIG. 6B and entering the SEND Y block 173 of FIG. 6B. The PROCESS Y subroutine 175 is shown in FIG. 6E, and involves determining and storing the larger of the corresponding Y values of the first and second portable processors and multiplying that larger value by the previously saved magnitude of the difference between the corresponding X values for the same X-Y data pair. The TRANSMIT and RECEIVE subroutines each accumulate running totals of the partially processed results, as indicated by block 166 of FIG. 6D and block 176 of FIG. 6B. Blocks 168 of FIG. 6D and 178 of FIG. 6B may incorporate any suitable subroutines or algorithms for interpreting, scaling, or otherwise processing the cumulative results in order to compute a "score" representative of the desired comparison between the stored data sets of the first and second portable processors.

The quantity which results when the magnitude of the difference between the corresponding X values which are compared as above is referred to herein as a "difference term". A difference term establishes the differences between the belief or preferences of the two individuals whose data sets are being compared with respect to the subject matter of the particular X-Y data pair. The value of Y which is obtained by selecting the larger of the compared Y terms as described above is referred to herein as the "amplifier term". An amplifier term represents the level of importance of the particular subject matter in the eyes of the one of the two persons who are comparing their data who believes it to be the most important. Thus, little weight will be accorded to subject matter which neither party believes is very important to compatibility with a person of the opposite sex.

Figure 5:
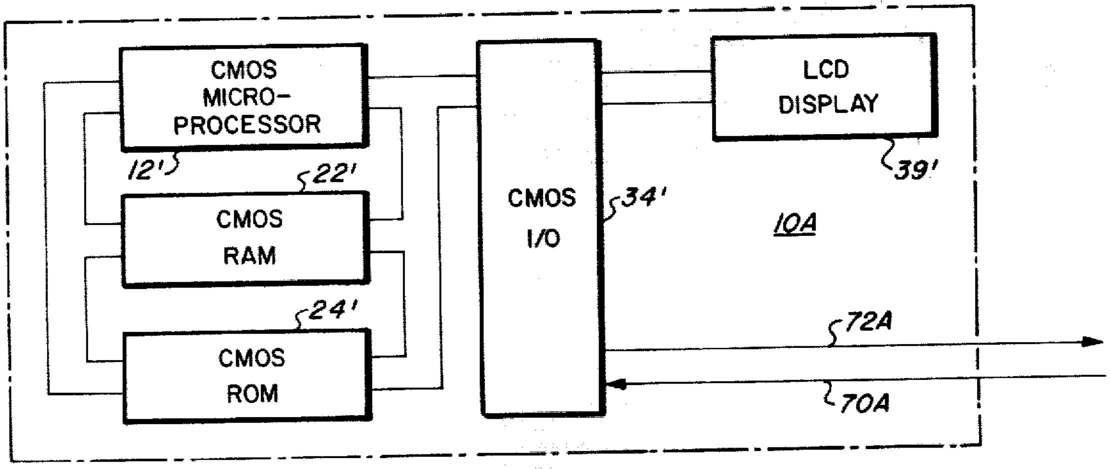
FIG. 5 is a block diagram showing a complementary metal oxide semiconductor embodiment of the portable processor of the invention.

Low power consumption is an important consideration in implementing the portable processor of the invention. It is important that the power level be low so that small batteries can be utilized to power the random access memory 22 without danger of loss of stored data in a short period of time because of battery failure. A block diagram of a low power CMOS (complementary metal oxide semiconductor) integrated circuit implementation of the circuitry 10A of the portable processor unit is shown in FIG. 5, wherein CMOS circuitry is utilized to implement microprocessor 12', random access memory 22', read only memory 24' and input/output circuitry 34', to which receive conductor 70A and transmit conductor 72A are connected. All of these circuit elements, in combination, can be powered utilizing several 1.5 disc-shaped batteries of the type commonly utilized to power electronic wristwatches. The liquid crystal display unit 39' is utilized in this embodiment of the invention to further reduce the power drain on the batteries over the power drain which would result from use of light emitting diode display units. Because of the very low power dissipation of CMOS circuitry, the stored data set may be maintained in random access memory 22 for a length of time approaching the shelf life of the batteries for the embodiment of the invention of FIG. 5. To further reduce the power drain on the batteries, switch 11, as shown in FIG. 1, can be utilized to turn off power to all elements of the portable processor except random access meory 22 when the portable processor is not being utilized.

It should be recognized that other types of personal data than data relating to compatibility of individuals as potential marriage partners can be compared, according to the present invention. For example, data concerning an individuals professional abilities and aptitudes can be stored. Potential employers can also input sets of data, corresponding to their requirements for potential employees, and the portable processor can be connected to the employer's computer, which can be a central data processing system or a similar portable processor, in order to obtain a quick matching of the applicant's qualifications with the qualifications required for a particular position.

Figure 7:
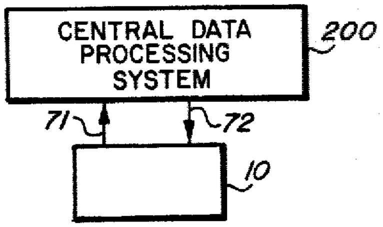
FIG. 7 is a block diagram illustrating inputting of data from a portable processor to a central data processing system.
Figure 8:
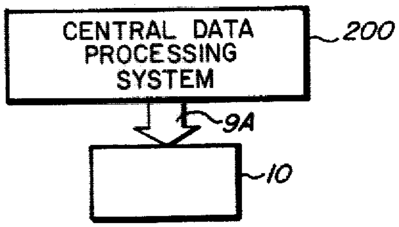
FIG. 8 is a block diagram illustrating a central data processing system modifying the stored program of a portable processor.

Another catagory of personal data which can be stored in a portable processor of the invention is medical history data. This type of information can then be inputted to a central data processing system of a hospital or insurance company. The embodiment of the invention shown in FIG. 7 includes a portable processor 10 coupled by means of busses 71 and 72 to a central data processing system 200. Thus, the portable processor can be utilized not only as a data comparison device, but also as a data storage device utilized as a means for conveniently inputting a large amount of personal data concerning an individual into a larger data processing system for analysis by the larger data processing system. The later data processing system can then modify or update (on the basis of a physical examination, for example) the stored data, and write it back into the portable processor 10.

It should be noted that the size of random access memory 22 can be increased to accommodate as many items of data as desired. In one embodiment of the invention the random access memory is partitioned (by the software) into blocks, each of which contains or stores a different type of personal data. The stored program includes a plurality of different algorithms, each suited to processing data stored in the various data blocks and, if desired, to comparing that data with corresponding data received from another portable processor. For example, in the previously described embodiment of the invention, wherein data pertaining to personality and personal preference variables suited to determining a compatibility score with a person of the opposite sex by comparison with corresponding data for another person, such data can be subdivided into blocks or subsets of data related to different personality variables, such as dominance, personal autonomy, introspection, sex drive, and the like. According to one embodiment of the invention, different stored algorithms compare process such different subsets of data catagories and produce separate "compatibility" scores for each such subset, as well as an overall personal compatibility score. One embodiment of the invention has additional or dual function input keys to allow the user to select and display the separate subgroup scores. In one embodiment of the invention, the additional input keys are utilized by the user to select any particular subgroup or combination of subgroups of data. The portable processors then perform the previously described transmitting and comparing operations only for the selected subgroup or subgroups. A compatibility score is then computed and displayed only for the selected subgroup or combination of subgroups.

In the above-described embodiment, wherein the stored data relates to professional qualifications of a person, that person inputs data into the portable processor in response to a questionnaire presented to him by a potential employer, trade or professional organization. Supervisors of various organizations within the firm needing employees input the needs of their respective organizations into portable processors in response to another questionnaire. Such information can alternatively be inputted into a central data processing system. Either way, the applicant can be quickly "matched" to those specific areas of the corporation most closely suited to his talents. The data can be entered in subsets in order to achieve more specific matching or correlation between the potential employee's needs and the employer's needs. Certain subsets of data can be slanted toward the overall needs of the corporation as a whole, and additional levels of data which vary to specific professional or technical areas can subsequently be compared, if the initial processing does not result in elimination of the applicant from consideration.

Another embodiment of the invention provides a plurality of stored algorithms for controlling the comparing of sets of data, wherein certain algorithms are utilized to cause a comparison of data stored in that particular portable processor with data stored in another portable processor, wherein the first portable processor is a "later generation" device with improved stored data processing algorithms, but retaining the capability of interfacing with "early generation" portable processors having older algorithms which compare and evaluate data in a different manner than the improved algorithms, which are developed on the basis of experience and research.

Yet another embodiment of the invention utilizes an electrically reprogrammable read only memory and means for coupling the electrically reprogrammable read only memory to a central data processing system which alters or updates the operating software of the portable processor by "writing" improved algorithms in the electrically reprogrammable read only memory. This capacity permits the portable processor to be utilized as a research tool, wherein algorithms for comparing data and producing compatibility factors are improved on the basis of experience and research to provide an improved and more reliable measure of compatibility of two individuals as potential marriage partners, or as employer and employee, etc.

Another embodiment of the invention includes a control which permits a first portable processor to retain the personal information received by the first portable processor from a second portable processor during the above described data comparison operation. The data can be retained in the first portable processor with permission of the owner of the second portable processor, wherein the permission is given in the form of activation of the control of the second portable processor, enabling the information to be retained in the first portable processor. The owner of the first portable processor unit can then input this information into a centralized data processing system to obtain a more comprehensive analysis of his or her compatibility with the owner of the second portable processor.

Figure 9:
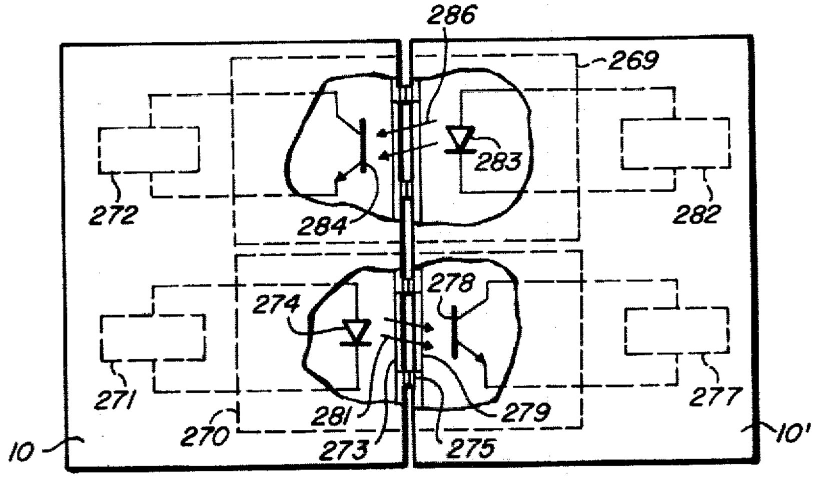
FIG. 9 is a diagram showing optical coupling devices to effect transmission of data between two portable processors.

FIG. 9 shows an embodiment of the invention which avoids the need for sockets 70', 71', and 72' and corresponding extendable prongs 70, 71, and 72 of FIG. 1. In FIG. 9, portable processors 10 and 10' in combination include two optical couplers designated by reference numerals 269 and 270. Optical coupler 270 includes a light emitting diode 274 housed within portable processor 10 and connected to and controlled by circuit 271 responsive to transmit conductor 72 of FIG. 3B. Circuitry 271 for activating light emitting diode 274 can readily be implemented by those skilled in the art, and therefore the details are not set forth herein. Portable processor 10 includes a transparent window designated by reference numerals 273, which window permits light emitted by light emitting diode 274 to propagate to the base of photo-transistor 278. Phototransistor 278 is housed in portable processor 10' and is positioned adjacent a second transparent window 279 in portable processor 10', so that light, designated by reference numeral 281, emitted by light emitting diode 274 propagates to photo-transistor 278, increasing its collector-emitter current. The increased collector-emitter current of phototransistor 278 is detected by circuitry 277, which circuitry is connected to a receive conductor such as receive conductor 70 of FIG. 3B. Circuitry for detecting the increased phototransistor collector-emitter current to produce a corresponding digital signal to be applied to the receive circuitry of portable processor 10' can readily be implemented by those skilled in the art. Consequently, circuitry 277 is not set forth in detail. Seal gaskets, designated by reference numeral 275, are formed around the perimeters of transparent windows 273 and 279 to prevent loss of light and reception of spurious light during communication of data between portable processor 10 and portable processor 10' by means of optical coupler 270.

Optical coupler 269 is formed, similarly to optical coupler 270, except that light emitting diode 283, responsive to circuitry 282, is housed in portable processor 10', and photo-transistor 284, whose current is detected by circuitry 272, is housed in portable processor 10. Thus, each portable processor can transmit data to the other and receive data from the other, so that the two data sets stored in the respective portable processors can be compared in the manner as previously described with respect to FIGS. 1, 3A, and 3B.

Figure 10:
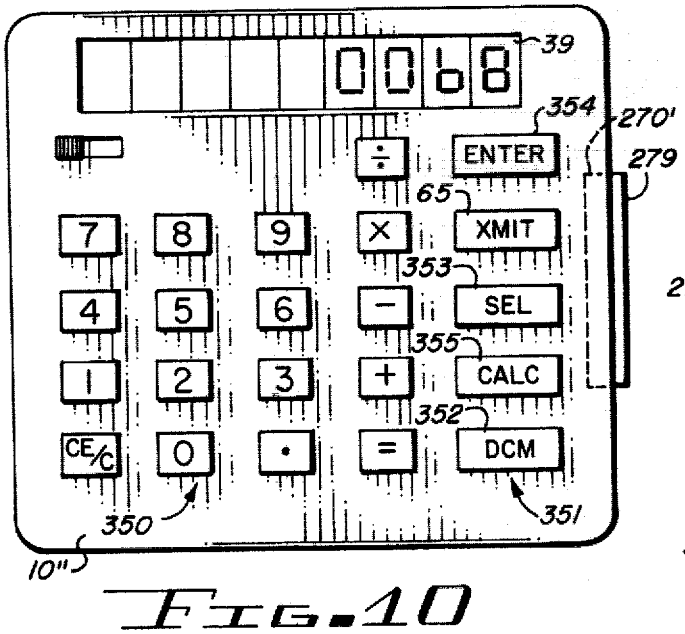
FIG. 10 is a diagram of a data comparison processor incorporated in a pocket calculator.

The portable processor of the invention can be incorporated in combination with a variety of other electronic computing devices, such as an ordinary pocket calculator 10'' shown in FIG. 10. Pocket calculator 10'' includes an ordinary calculator keyboard, generally designated by reference numeral 350. However, pocket calculator 10'' also includes a group of keys generally designated by 351 for permitting operation of pocket calculator 10'' as a portable processor to compare a set of personal data stored therein with corresponding sets of personal data stored in other mateable portable processors. Pocket calculator 10'' includes a "data comparison mode" input key 352 for activating circuitry such as the circuitry shown in FIGS. 3A and 3B to set device 10'' in the data comparison mode. "Calculate mode" key 355 sets pocket calculator 10'' to a mode wherein keyboard 350 activates conventional calculator circuitry (not shown) to provide ordinary calculator functions such as add, subtract, multiply, and divide. For either mode of operation, alphanumeric display unit 39 displays the results of operation of pocket calculator 10 in either the calculator mode or in the data set comparison mode. "Select" key 353 permits displaying of the values of an X-Y data pair number inputted to pocket calculator 10" when it is in the data comparison mode utilizing keys 350. "Enter" key 354 permits entry of X and/or Y of a previously selected X/Y data pair selected by means of "select" key 353 and keyboard 350. The respective X and Y values are selected by means of keyboard 350. Transmit key 65 operates in the manner previously explained with respect to FIGS. 1, 3A and 3B. Device 10" can communicate with another portable processor by means of optical coupling devices 270', which includes a light emitting diode and a phototransistor, housed in separate compartments and as explained previously with reference to FIG. 9. Alternatively, extendable prongs and corresponding sockets can be utilized, as previously explained with respect to FIG. 1.

Figure 11:
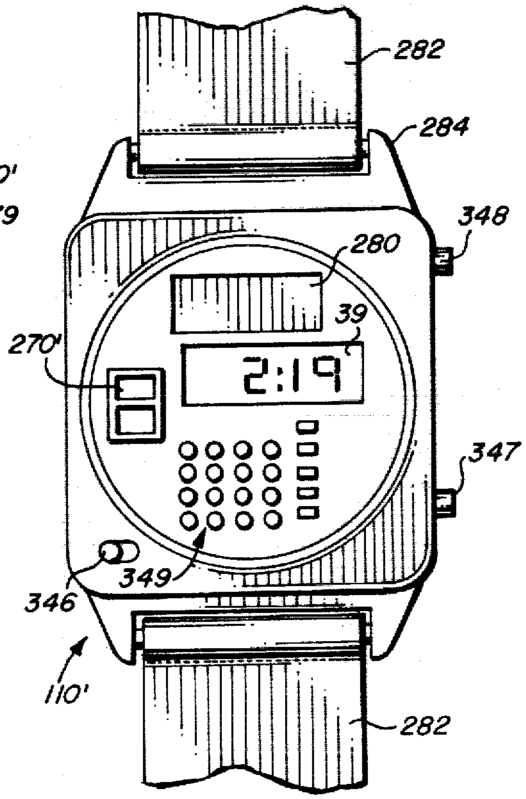
FIG. 11 is a partial diagram of a wristwatch incorporating a data comparison processor and a calculator.

The portable processor data comparison device of the present invention can be incorporated within an electronic wristwatch, as shown in FIG. 11. The embodiment 110' shown in FIG. 11 incorporates housing 284 and wristband 282. Liquid crystal display 39 displays the time of day when the wristwatch processor 110' is operating in the "time" mode, and displays the values of the X-Y data pairs being entered, as previously explained, or the results of a comparison of a stored set of personal data with a stored set of personal data of a separate unit, as previously explained. A miniature keyboard, generally indicated by reference numerals 349, includes data input keys and control keys, and, if an electronic calculator is also incorporated in wristwatch/processor, 110', the usual calculator function keys. The keys are sufficiently small to be depressed with a pencil tip or the like. A solar panel 280 is incorporated to provide power to charge the batteries which operate the time-keeping, computing, and data processing circuitry incorporated in this embodiment of the invention. Additional control keys such as 346, 347 and 348 are mounted on the front and sides of housing 284 to permit the user to easily change modes of operation of the device. An optical coupling unit 270' includes a photodiode in one compartment and a phototransistor in another compartment, so that each can be mated with a corresponding optical coupling unit of a separate portable data processing device to permit bidirectional transmission of data between unit 110' and a corresponding unit.

Although the invention has been described by referring to particular embodiments thereof, it will be recognized that various arrangements of parts and steps readily apparent to those skilled in the art are within the spirit and scope of the invention.

I claim:

1. A system for comparing first and second sets of data, said system comprising:

(a) first and second portable computing devices;
(b) first storage means in said first computing device for storing said first set of data, said first set of data including a plurality of items of information, said second set of data including items of information with which corresponding items of information of said first set of data are to be respectively compared, and second storage means in said second computing device for storing said second set of data, said plurality of items of said first set corresponding respectively on an item-by-item basis to said plurality of items of said second set;
(c) switch means in one of said first and second portable computing devices for producing a first signal to initiate data transmission;
(d) first transmitting means in said first computing device for transmitting data of said first set from said first computing device to said second computing device in response to said first signal;
(e) data entry means for entering said first set of data into said first storage means while said first computing device is not coupled to said second computing device and before said producing of said first signal to initiate said transmitting data of said first set;
(f) first receiving means in said second computing device for receiving said data of said first set transmitted from said first computing device;
(g) first comparing means in said second computing device responsive to said second storage means and said first receiving means for comparing said items of said data of said second set stored in said second storage means with said corresponding items of said received data of said first set to produce a plurality of comparison data items corresponding to respective ones of said items of said first set;
(h) computing means in said second computing device responsive to said first comparing means for operating on said plurality of comparison data items to effect computing of a first number, said first number being indicative of the degree of similarity between all of said data of said first and second sets; and
(i) first display means in said second computing device responsive to said first comparing means for displaying information representative of said first number to provide an indication of the compatability of things or persons represented by said first and second sets of data, respectively.

2. The system of claim 1 wherein said first and second storage means are each random access memories.

3. The system of claim 2 wherein said random access memories are complementary metal oxide semiconductor memories.

4. The system of claim 2 wherein said first portable computing device further includes first data entry means for entering said first set of data into said first storage means.

5. The system of claim 4 wherein said first data entry means includes a plurality of depressable keys and a plurality of switches activated, respectively, by said depressable keys.

6. The system of claim 1 wherein said first computing device further includes second transmitting means for transmitting data of said second data set from said second computing device to said first computing device, second computing means responsive to said first storage means for comparing data of said first set with received data from said second set, and second display means responsive to said second comparing means for displaying information representative of said comparing in said first portable computing device.

7. The system of claim 6 wherein said first portable computing device includes first microprocessor means coupled to said first storage means and said first transmitting means for controlling said transmitting of said data of said first set.

8. The system of claim 6 wherein said second comparing means includes elements of said first microprocessor means cooperating to compare said data of said first set with said received data of said second set.

9. The system of claim 8 wherein said first and second portable computing devices are substantially identical.

10. The system of claim 6 wherein said first storage means, said first transmitting means, said second receiving means, said second comparing means, and said first microprocessor means are all composed of complementary metal oxide semiconductor integrated circuits.

11. The system of claim 10 wherein said second display means includes a liquid crystal display unit.

12. The system of claim 6 wherein said first storage means, said first transmitting means, and said second comparing means are all included in a single integrated circuit chip.

13. The system of claim 1 further including first conductive means coupling said first transmitting means to said first receiving means for serially conducting bits of said first set of data to said first receiving means.

14. The system of claim 1 wherein said first and second sets of data include a plurality of corresponding items of personal data of first and second persons, respectively.

15. The system of claim 14 wherein said first and second sets of data include data representing personality profiles of said first and second persons, respectively.

16. A system for comparing first and second sets of data, said system comprising in combination:

(a) first and second portable computing devices;

(b) first storage means in said first computing device for storing said first set of data, and second storage means in said second computing device for storing said second set of data, said first set of data including a plurality of items of information, said second set of data including a plurality of items of information with which corresponding items of information of said first set of data are to be respectively compared, said plurality of items of said first set corresponding, respectively, to said plurality of items of said second set;

(c) first transmitting means in said first computing device for transmitting data of said first set from said first computing device to said second computing device;

(d) second transmitting means in said second computing device for transmitting data of said second set of data from said second computing device to said first computing device;

(e) first data entry means in said first computing device for entering said first set of data into said first storage means while said first and second computing devices are not coupled together and before said transmitting of data of said first set or said second set;

(f) second data entry means in said second computing device for entering said second set of data into said second storage means while said first and second computing devices are not coupled together and before said transmitting of data of said first set or said second set;

(g) first receiving means in said first computing device for receiving data of said second set from said second computing device;

(h) second receiving means in said second computing device for receiving data of said first set from said first computing device;

(i) first comparing means in said first computing device responsive to said second storage means and said first receiving means for comparing said items of said data of said first set with said corresponding items of said received data of said second set to produce a plurality of comparison data items corresponding, respectively, to said items of said first set;

(j) second comparing means in said second computing device responsive to said second storage means and said second receiving means for comparing said items of said data of said second set with said corresponding items of said received data of said first set to produce said plurality of comparison data items;

(k) first computing means in said first computing device responsive to said first comparing means for operating on said plurality of comparison data items to compute a first number, said first number being indicative of the degree of similarity between all of said data of said first and second sets;

(l) second computing means in said second computing device responsive to said second comparing means for operating on said plurality of comparison data items to compute a second number, said second number also being indicative of the degree of similarity between all of said data of said first and second sets;

(m) first display means in said first computing device responsive to said first comparing means for displaying said first number; and (n) second display means in said second computing device responsive to said second comparing means for displaying said second number.

17. The system of claim 16 wherein said first and second storage means include first and second random access memories, respectively.

18. The system of claim 16 wherein said first transmitting means and said first receiving means in combination include first read only memory means for storing a microinstruction operating program, first microprocessor means coupled to said first read only memory means, for executing said microinstructions program, and first interface adaptor means for controlling said transmitting of data of said first set and wherein said second transmitting means and said second receiving means in combination include second read only memory means for storing a second microinstruction operating program, second microprocessor means coupled to said second read only memory means for executing said second microinstruction program, and second interface adaptor means coupled to said microprocessor means for controlling said transmitting of said second set of data.

19. The system of claim 18 wherein said first and second microinstruction programs are substantially identical.

20. A portable computing device for comparing a first set of data stored in said portable computing device with a second set of data stored in a remote computing device to which said portable computing device can be temporarily connected, said portable computing device comprising in combination:

(a) coupling means for temporarily coupling said portable computing device to said remote computing device to effect transmission of data of said first set from said portable computing device to said remote computing device and to effect transmission of data from said second set from said remote computing device to said portable computing device, said first set of data including a plurality of items of information about a first thing, said second set of data including a plurality of corresponding items of information about a second thing;

(b) first storage means in said portable computing device for storing said first set of data;

(c) first transmitting means connected to said coupling means for transmitting data of said first set from said portable computing device to said remote computing device via said coupling means;

(d) first data entry means in said portable computing device for entering said first set of data into said first storage means while said portable computing device and said remote computing device are not coupled together and before said transmission of data of said first set and said data of said second set;

(e) second data entry means in said remote computing device for entering said second set of data into said remote computing device while said portable computing device and said remote computing device are not coupled together and before said transmission of data of said first set and said data of said second set;

(f) first receiving means responsive to said coupling means for receiving data of said second set from said remote computing device;

(g) first comparing means in said portable computing device responsive to said first receiving means and said first storage means for comparing said items of said data of said first set with said corresponding items of said received data of said second set to produce a plurality of comparison data items corresponding, respectively, to said items of said first set;

(h) first computing means in said portable computing device responsive to said first comparing means for operating on said plurality of comparison data items to compute a first number, said first number being indicative of the degree of similarity between all of said data of said first and second sets; and (i) first display means in said portable computing device responsive to said first comparing means for displaying said first number.

21. The portable computing device of claim 20 further including means for manually entering said first set of data into said first storage means.

22. The portable computing device of claim 20 wherein said coupling means includes manually extendable conductor means for engaging a corresponding receiving connector device in said remote computing device and further includes a receiving connector device for receiving a conductor from said remote computing device.

23. The portable computing device of claim 20 wherein said coupling means includes:

(a) first optical transmitting means responsive to said first transmitting means for transmitting light signals representative of data of said first set of data to said remote computing device; and (b) first optical receiving means coupled to said first receiving means for receiving light signals from said remote computing device representative of data from said second set of data.

24. The portable computing device of claim 23 wherein said first optical transmitting means includes a light emitting diode and wherein said first optical receiving means includes a photodiode housed in said portable computing device in a compartment which isolates said diode from said light emitting diode.

25. The portable computing device of claim 20 including a complementary field effect transistor processor including said first transmitting means, said first receiving means and said first comparing means, and wherein said first display means includes a liquid crystal alphanumeric display unit.

26. A method of utilizing first and second computing devices to compare first and second sets of data, said first computing device being portable, said method comprising the steps of:

(a) entering and storing said first and second sets of data in said first and second computing devices, respectively, said first set of data including a plurality of items of information, said second set of data including a plurality of items of information, said plurality of items of said first set corresponding, respectively, to said plurality of items of said second set;

(b) coupling said first and second computing devices to permit transfer of stored data between said first and second computing devices;

(c) transmitting data of said first set from said first computing device to said second computing device by means of said coupling, said entering and storing steps being performed before said coupling and said transmitting steps;

(d) comparing said items of information of said transmitted data now in said second computing device with said corresponding items of information of said data of said second set in said second computing device to produce a plurality of comparison data item numbers corresponding to respective ones of said items of information of said first set;

(e) operating on said plurality of comparison data item numbers to compute a first number that is indicative of the degree of similarity between said data of said first set and said data of said second set; and (f) displaying information representative of said first number to provide an indication of the degree of similarity of things or persons represented by said first and second sets of data, respectively.

27. The method of claim 26 wherein said first and second sets of data contain personal data of first and second persons.

28. The method of claim 27 further including the step of computing a compatibility score between said first and second persons based on said displaying, wherein said displaying includes displaying said compatibility score.

29. The method of claim 26 wherein said second computing device includes a remote data processing system for receiving said first set of data from said first computing device and analyzing said first set of data.

30. The method of claim 26 wherein said first set of data contains medical data for a first person and said second set contains comparison data for a predetermined purpose.

31. The method of claim 26 further including the step of updating data of said first set in response to data of said second set.

32. The method of claim 26 wherein said first computing device includes an electrically alterable read only memory for storing a microinstruction operating program and a processor coupled to the electrically alterable read only memory for executing the microinstruction program, said method further comprising the step of altering said microinstruction program in response to data of said second set.

33. The method of claim 26 further including the steps of storing said second set of data in said first computing device and subsequently transmitting said second set of data to a third computing device for analysis by said third computing device.

34. The method of claim 26 wherein said first and second sets of data each include a plurality of subsets of data, wherein said comparing step is performed between all of the data in a selected subset of said first set and all of the data in a selected subset of said second set, wherein said method further includes the step of computing a score indicative of the results of said comparing of said data in said selected subsets, wherein said displaying step includes displaying said score.

35. A method of utilizing first and second portable computing devices to compare first and second sets of data, each of said sets including a plurality of corresponding data pairs, said plurality of data pairs of said first set corresponding, respectively, to said plurality of data pairs of said second set, each of said data pairs including a first data number and a second data number, said method comprising the steps of:

(a) entering said storing said first and second sets of data in said first and second computing devices, respectively, said first set of data including a plurality of items of personal information about a first person, said second set of data including a plurality of items of personal information with which corresponding items of information of said first set of data are to be respectively compared;

(b) coupling said first and second computing devices to permit transfer of stored data between said first and second computing devices;

(c) transmitting the first data number of one of said data pairs from said first computing device to said second computing device;

(d) in said second computing device, comparing said transmitted first data number with the first data number of the corresponding data pair stored in said second computing device to obtain a difference number equal to the magnitude of the difference between said transmitted first data number and said corresponding first data number;

(e) storing said difference number in said second computing device;

(f) transmitting the second data number of said data pair from said first computing device to said second computing device, said entering and storing steps being performed before steps (b), (c) and (f);

(g) in said second computing device, comparing said transmitted second data number with the second data number of the corresponding data pair stored in said second computing device to obtain an amplifier number equal to the larger of said transmitted second data number and said corresponding second data number;

(h) multiplying said difference number by said amplifier number to obtain a partial comparison result number;

(i) computing a plurality of additional partial comparison result numbers corresponding to additional corresponding data pairs stored in said first and second computing devices, respectively;

(j) utilizing at least some of said partial comparison result numbers to compute a number indicating the overall degree of matching or compatability between said first and second sets of data; and (k) displaying said computed number.

* * * * *